US010454923B2

(12) United States Patent
Chapman

(10) Patent No.: US 10,454,923 B2
(45) Date of Patent: Oct. 22, 2019

(54) SYSTEM AND METHOD FOR PROVIDING LIMITED ACCESS TO DATA

(71) Applicant: Capital One Financial Corporation, McLean, VA (US)

(72) Inventor: Jeffrey Michael Chapman, Wilmington, DE (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/710,978

(22) Filed: Sep. 21, 2017

(65) Prior Publication Data

US 2018/0013749 A1    Jan. 11, 2018

Related U.S. Application Data

(63) Continuation of application No. 15/226,042, filed on Aug. 2, 2016, now Pat. No. 9,800,572, which is a (Continued)

(51) Int. Cl.
*H04L 29/06* (2006.01)
*G06Q 30/06* (2012.01)
(Continued)

(52) U.S. Cl.
CPC ........ *H04L 63/083* (2013.01); *G06F 21/6218* (2013.01); *G06Q 30/06* (2013.01); *G07F 7/1025* (2013.01); *H04W 12/06* (2013.01)

(58) Field of Classification Search
CPC .................................................... H04L 63/083
(Continued)

(56) References Cited

U.S. PATENT DOCUMENTS 5,793,302 A * 8/1998 Stambler ................ G06Q 20/02
340/5.86
6,044,349 A * 3/2000 Tolopka .............. G06F 21/6218
380/277

(Continued)

OTHER PUBLICATIONS

Agrawal, Manish, et al., A Conceptual Approach to Information Security in Financial Account Aggregation, ACM International Conference Proceeding Series; vol. 60, pp. 619-626, ACM, New York, NY, 2004.

*Primary Examiner* — Harris C Wang
(74) *Attorney, Agent, or Firm* — Troutman Sanders LLP; Christopher J. Forstner; John A. Morrissett

(57) ABSTRACT

A system and computer-implemented method for providing access to data of a first party including receiving information for identifying the first party, authenticating the first party using the received information for identifying the first party and generating a first read-only personal identification number (PIN). The first read-only PIN is associated with a first set of access rights for the data of the first party and provided to a second party. The first read-only PIN is stored with the first set of access rights in a computer database. A third party receives the first read-only PIN from the second party, authenticates the received first read-only PIN using the stored first read-only PIN and provides the second party with access to at least a portion of the data of the first party using the first set of access rights associated with the first read-only PIN if the received first read-only PIN is authenticated.

18 Claims, 7 Drawing Sheets

Related U.S. Application Data continuation of application No. 12/778,380, filed on May 12, 2010, now Pat. No. 9,406,186.

(51) Int. Cl.
  *G07F 7/10* (2006.01)
  *G06F 21/62* (2013.01)
  *H04W 12/06* (2009.01)

(58) Field of Classification Search
  USPC .......................................................... 726/7
  See application file for complete search history.

(56) References Cited

U.S. PATENT DOCUMENTS

| | | | |
|---|---|---|---|
| 7,266,684 B2 | 9/2007 | Jancula | |
| 7,370,011 B2 | 5/2008 | Bennett et al. | |
| 7,448,538 B2* | 11/2008 | Fletcher | G06Q 20/12 |
| | | | 235/379 |
| 8,751,394 B2* | 6/2014 | Dudley | G06Q 20/32 |
| | | | 235/375 |
| 2001/0051907 A1 | 12/2001 | Kumar et al. | |
| 2002/0083014 A1* | 6/2002 | Brickell | G06Q 10/10 |
| | | | 705/76 |
| 2003/0023494 A1 | 1/2003 | Ramamurthi | |
| 2003/0023594 A1* | 1/2003 | Ramamurthi | G06F 16/958 |
| 2005/0010780 A1* | 1/2005 | Kane | G06F 21/6245 |
| | | | 713/182 |
| 2005/0015609 A1* | 1/2005 | Delorme | G06Q 20/341 |
| | | | 713/193 |
| 2006/0204051 A1* | 9/2006 | Holland, IV | G06Q 20/02 |
| | | | 382/115 |
| 2006/0218196 A1* | 9/2006 | Kurita | G06Q 20/341 |
| 2006/0230437 A1* | 10/2006 | Alexander Boyer | |
| | | | G06F 21/6245 |
| | | | 726/4 |
| 2007/0038931 A1* | 2/2007 | Allaire | G06Q 30/0239 |
| | | | 715/206 |
| 2007/0242827 A1 | 10/2007 | Prafullchandra et al. | |
| 2007/0277229 A1* | 11/2007 | Vogel | G06F 21/33 |
| | | | 726/4 |
| 2007/0284434 A1* | 12/2007 | Fletcher | G06Q 20/12 |
| | | | 235/379 |
| 2008/0133413 A1 | 6/2008 | Bennett et al. | |
| 2009/0287837 A1* | 11/2009 | Felsher | G06F 19/328 |
| | | | 709/229 |
| 2010/0198730 A1* | 8/2010 | Ahmed | G06F 21/6209 |
| | | | 705/50 |

\* cited by examiner

Customer Maintenance for Read-Only PIN 4634A73

Assign Your Read-Only PIN 46334A73

To get started enabling an Accessor to access your information with the Read-Only PIN you need to enter some identifying information for the Accessor and specify the access rights you wish the Accessor to have.

Enter the name of the company or the phone number of the individual or company you would like to add as an Accessor to Read-Only PIN 4634A73

Check the Accounts or Information you wish the Accessor to have access to:

- ☐ Checking Account 46992877
- ☐ Savings Account 34276843
- ☐ Credit Card Account 2476893348765544
- ☐ Mutual Funds Account 7845391
- ☐ Brokerage Account 6564385

- ☐ Automobile Loan 6474348
- ☐ Automobile Insurance Policy
- ☐ Homeowner's Insurance Policy
- ☐ Life Insurance Policy
- ☐ Personal Information on File ( Back )    ( Assign )

Figure 6

SYSTEM AND METHOD FOR PROVIDING LIMITED ACCESS TO DATA

CROSS REFERENCE TO RELATED APPLICATION

The subject application is a Continuation of U.S. patent application Ser. No. 15/226,042 filed Aug. 2, 2016, which is a Continuation of U.S. application Ser. No. 12/778,380 filed May 12, 2010, now U.S. Pat. No. 9,406,186, the contents of which are hereby incorporated by reference in their entireties.

FIELD OF THE INVENTION

The present disclosure is directed generally to systems and methods for providing an outside party with limited access to source data of a first party. In particular, the present disclosure relates to systems and methods for providing a virtual authentication credential to an outside party with improved protection for first party identity and improved access control for first party source data.

DESCRIPTION OF THE RELATED ART

Securing customer source data stored with data custodians, or personally at a customer's local computer, represents an ongoing challenge for consumers, businesses, financial institutions and a wide variety of data custodians. As more data becomes available on the Internet, providing secure and limited access to customer information has become increasingly difficult.

Outside parties have long desired access to customer source data for a wide variety of purposes. For example, a data aggregator is a web service or third party agent that consolidates a customer's financial and personal information and presents it in a concise, easy to read fashion. An aggregator may access shopping and financial service websites to extract customers' data and repackage the data for presentation on the aggregator's web site. Another example is a data miner A data miner is a web service or third party agent that often uses software to analyze relationships and patterns, such as classes, clusters, associations or sequential patterns, in stored source data and summarize the relationships identified in a useful format. Data miners and aggregators use several techniques to access customers' information from the variety of shopping and financial web sites. For example, a data aggregator or miner may use a screen scraping technique where the aggregator uses a customer's user identification and password to access the customer's account data and download the source data to a central server or system. The data custodian often does not have control of the data aggregator's use of the website. Additionally, the data aggregator or miner's knowledge of the customer's user identification and password has raised significant privacy and security concerns.

An additional technique used by data aggregators or data miners is permissive aggregation or mining. In this technique, the data aggregator or data miner enters into a contract with the data custodian to obtain a private feed for all of their data requirements. However, the data custodian must invest in establishing the private feeds and the data aggregators or miners will use the customer's identification and password to access the customer source data. Although, this technique permits some control by the data custodian, similar privacy and security concerns still exist with this technique.

Conventional systems and methods have utilized a variety of techniques to limit outside parties' access to customer information. For example, U.S. Patent Publication Ser. No. 2001/0051907 to Kumar et al discloses a portfolio-tracking module and method for masking or encrypting passwords such that the passwords are not transmitted in cleartext to a website. The module and method is useful in limiting the password's vulnerability to network attacks. Kumar also discloses that encrypted versions of the login information is stored on a data aggregator's server. Additionally, U.S. Patent Publication Ser. No. 2007/0242827 to Prafullchandra et al discloses a selective encryption control system and service where accesses to a user's account are logged and usage and anomalous activity alerts are provided. Prafullchandra also discloses that the user may limit the number of accesses to a user's account to a specific number of times. U.S. Pat. No. 7,266,684 to Jancula discloses a secure ticket system that allows an aggregator site access to a user's commerce website (e.g. financial website) without the user having to divulge their login information. However, Jancula does not disclose limiting an aggregator site's to certain user information. The publication "A Conceptual Approach to Information Security in Financial Account Aggregation," to Agrawal et al. discloses an aggregator credential system where the aggregator has different permissions, such as view only permissions, than the user. U.S. Patent Publication Ser. No. 2008/0133413 to Bennett et al discloses an aggregator portal system where the portal has limited access, such as read access, to a user's financial website. Bennett also discloses that a different login may be linked to the portal, so that the user's account number and password is not sent to the financial website.

However, there remains a need in the art to overcome conventional limitations and provide a novel system and method for providing access to the data of a first party that empowers the first party to control what outside parties may access their source data, or that provides the ability to limit the scope of the source data provided, such as limiting the access to a type of access and/or access to subset of the source data, with improved security and first party identity protection capability.

SUMMARY OF THE INVENTION

One embodiment of the present invention provides a computer-implemented method for providing access to data of a first party, the data being stored in a computer database, the method including, receiving information for identifying the first party, authenticating the first party using the received information for identifying the first party, generating a first read-only personal identification number (PIN), associating the first read-only PIN with a first set of access rights for the data of the first party, providing the first read-only PIN to a second party, storing the first read-only PIN with the first set of access rights in the computer database, receiving the first read-only PIN from the second party, authenticating the received first read-only PIN using the stored first read-only PIN, and providing the second party with access to at least a portion of the data of the first party using the first set of access rights associated with the first read-only PIN if the received first read-only PIN is authenticated. The method may include determining usage information for the first read-only PIN and providing the first party with the determined usage information. The method may also include cancelling the first read-only PIN to prevent access by the second party to the at least a portion of the data of the first party associated with the first set of access rights of the first read-only PIN. The method may further include selecting a third party for receiving the first read-only PIN, associating the first read-only PIN with information for identifying the selected third party and with a second set of access rights for the data of the first party, storing the first read-only PIN with the information for identifying the selected third party and with the second set of access rights in the computer database, receiving at least a portion of the information for identifying the selected third party, receiving the first read-only PIN from the selected third party, authenticating the received first read-only PIN using the stored first read-only PIN, authenticating the selected third party using the received at least a portion of the information for identifying the selected third party and the stored information for identifying the selected third party and providing the selected third party with access to at least a portion of the data of the first party using the second set of access rights associated with the first read-only PIN if the first read-only PIN and the selected third party are authenticated.

Another embodiment of the present invention provides a computer-implemented method for providing access to data of a first party, the data stored in a computer database, the method comprising receiving information for identifying the first party, authenticating the first party using the received information for identifying the first party, generating at least two unique read-only personal identification numbers (PINs), associating each unique read-only PIN with a unique party and a unique set of access rights for the data of the first party, providing each unique read-only PIN to each associated unique party, storing each unique read-only PIN with each associated unique set of access rights in the computer database, receiving one of said unique read-only PINs from the unique party associated with the received unique read-only PIN, authenticating the received unique read-only PIN using the stored read-only PINs and providing the unique party associated with the received unique read-only PIN with access to at least a portion of the data of the first party using the unique set of access rights associated with the unique read-only PIN if the received unique read-only PIN is authenticated. The method may include determining usage information for one of the unique read-only PINs and providing the first party with the determined usage information. The method may also comprise cancelling a unique read-only PIN to prevent access by the unique party associated with the cancelled unique read-only PIN to the at least a portion of the data of the first party associated with the unique set of access rights of the cancelled unique read-only PIN.

An additional embodiment of the present disclosure provides a system for providing access to data of a first party, including a computer processor having a computer readable storage medium, the computer readable storage medium comprising computer-executable instructions stored therein for executing on said processor, the instructions for causing the processor to receive information for identifying the first party, authenticate the first party using the received information for identifying the first party, generate a first read-only personal identification number (PIN), associate the first read-only PIN with a first set of access rights for the data of the first party, provide the first read-only PIN to a second party, store the first read-only PIN with the first set of access rights. receive the first read-only PIN from the second party, authenticate the received first read-only PIN using the stored first read-only PIN and provide the second party with access to at least a portion of the data of the first party using the first set of access rights associated with the first read-only PIN if the received first read-only PIN is authenticated. The computer readable storage medium may include computer-executable instructions stored therein for causing the processor to determine usage information for the first read-only PIN and provide the first party with the determined usage information. The computer readable storage medium may also include computer-executable instructions stored therein for causing the processor to cancel the first read-only PIN to prevent access by the second party to the at least a portion of the data of the first party associated with the first set of access rights of the first read-only PIN.

A further embodiment of the present invention provides a computer-implemented method for providing access to data of a first party, the data stored in a computer database, the method including receiving information for identifying the first party, authenticating the first party using the received information for identifying the first party, generating at least two unique read-only personal identification numbers (PINs), associating each unique read-only PIN with a unique party and a unique set of access rights for the data of the first party, providing each unique read-only PIN to each associated unique party, storing each unique read-only PIN with each associated unique set of access rights in the computer database, receiving a payment from a party associated with a unique set of access rights comprising payment requirements for receiving access rights to the data of the first party, processing the received payment, receiving a read-only PIN from the paying party, authenticating the received read-only PIN using the stored read-only PINs; and providing the paying party with access to at least a portion of the data of the first party using the unique set of access rights associated with the received read-only PIN if the received read-only PIN is authenticated and if the payment from the paying party is processed. These embodiments and many other objects and advantages thereof will be readily apparent to one skilled in the art to which the invention pertains from a perusal of the claims, the appended drawings, and the following detailed description of the embodiments.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

FIG. 6 is an illustrative website screenshot according to an embodiment of the present invention.

DETAILED DESCRIPTION OF THE EMBODIMENTS OF THE INVENTION

Figure 1:
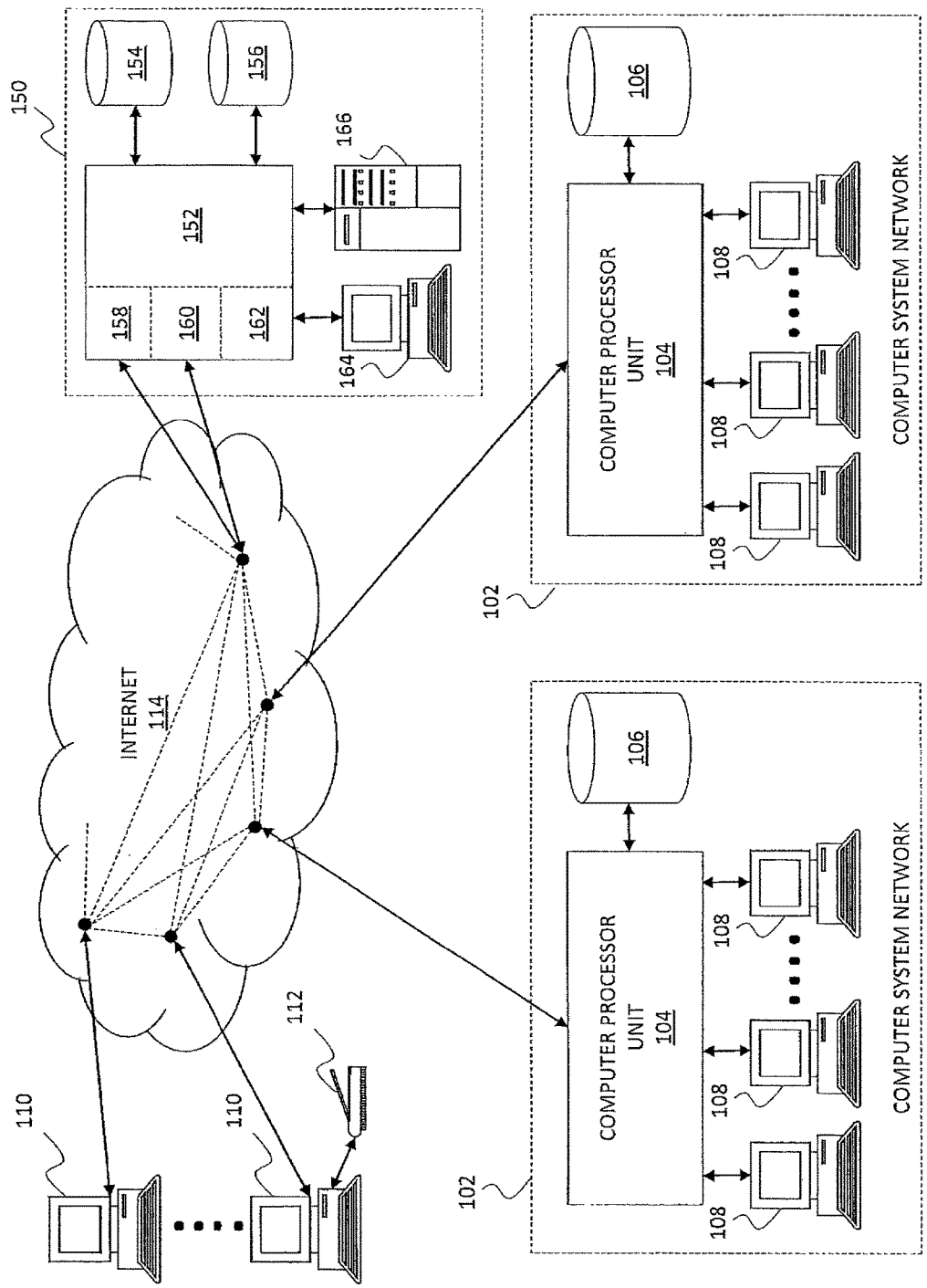
FIG. 1 is a diagram of a source data access system connected to a plurality of interconnected computer system networks and devices according to an embodiment of the present disclosure.

With reference to the Figures where like elements have been given like numerical designations to facilitate an understanding of the present invention, the various embodiments of a system and method for securing financial information in payment instruments, such as checks, is provided.

The present disclosure may be utilized to provide access to source data of a customer stored with a data custodian. The data custodian may be, for example, a financial institution such as a bank, brokerage firm or other similar entity. However, a data custodian may also be any agent or any agent's computer or computers acting as an intermediary between two other parties or computers of two other parties where access, such as via the Internet, to certain information or data is designed to be limited, whether or not the information or data is confidential. A data custodian may also include a secure operating system operating on a first party's microprocessor-based computer terminal or device capable of interactive network communications, or wireless device that connects to, and communicates through, the Internet using, for example, a wireless access protocol (WAP), and exercising filesystem access control to limit access to certain locally stored source data of the first party. The present disclosure may utilize a computer-based system and method that provides an outside party with access to source data and information of numerous data custodian customers based on customer information profiles that may be developed over time as described below. "Online" may mean connecting to or accessing source data or information from a location remote from the data custodian or a branch of the data custodian. Alternatively, "online" may refer to connecting or accessing an electronic network (wired or wireless) via a computer as described below. In exemplary embodiments, the method and system are web-based, as described below. The outside parties may include, but are not limited to, data aggregators, data aggregation service providers, data comparison aggregators, financial institutions, brokerage firms, online trading service providers, online banking service providers, data mining service providers, individual and business accounting service providers such as Intuit, or interested individuals, businesses or other parties.

The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

One of the most outstanding features of the Web is its use of hypertext, which is a method for cross-referencing. In most Web sites, certain words or phrases appear in text of a different color than the surrounding text. This text is often also underlined. Sometimes, there are hot spots, such as buttons, images, or portions of images that are "clickable." Clicking on hypertext or a hot spot causes the downloading of another web page via a protocol such as hypertext transport protocol (HTTP). Using the Web provides access to millions of pages of information. Web "surfing" is done with a Web browser, the most popular of which presently are Apple Safari and Microsoft Internet Explorer. The appearance of a particular website may vary slightly depending on the particular browser used. Versions of browsers have "plug-ins," which provide animation, virtual reality, sound, and music. Interpreted programs (e.g., applets) may be run within the browser.

FIG. 1 shows a source data access system 150 connected to a plurality of interconnected computer system networks 102 and devices 110. Each computer system network 102 may include a corresponding local computer processor unit 104, which is coupled to a corresponding local data storage unit 106 and to local network party terminals 108. A computer system network 102 may be a local area network (LAN) or part of a wide area network (WAN), for example. The source data access system 150 and local computer processor units 104 are selectively coupled to a plurality of party devices 110 through Internet 114. Each of the plurality of party devices 110 and local party terminals 108 (collectively, party terminals) may have various devices connected to their local computer systems, such as scanners, barcode readers, printers, finger print scanners, mouse devices, keyboards, and other interface devices 112. The source data access system may be protected from network attacks by a piece of software or specialized hardware, commonly known as a firewall 140. It is understood that firewall 140 is used to block network connections from the outside world to source data access system 150 inside the firewall. It is also understood that firewalls are often governed by a set of rules that specify what IP addresses, ports, and even types of traffic are allowed to connect to machines inside the firewall. It is also understood that other network security defense tools may be employed as part of a defense-in-depth strategy to secure source data access system 150 including, but not limited to, intranet subnet partitioning, a demilitarized zone, intrusion detection or host-based intrusion prevention systems.

Source data access system 150 includes a processing unit 152 coupled to one or more data storage units 154, 156. The processing unit 152 provides front-end graphical user interfaces (GUI), e.g., customer GUI 158 and source data access service provider GUI 160, as well as back-end GUIs 162 to a party's terminal 108, 110 or to local computer 164. The GUIs can take the form of, for example, a webpage that is displayed using a browser program local to the party terminal 108, 110, or to local computer 164. It is understood that the source data access system 150 may be implemented on one or more computers 164, servers 166, or like devices. For example, a source data access system may include servers programmed or partitioned based on permitted access to the source data of a data custodian customer. Front- and back-end GUIs 158, 160, 162 are preferably portal pages that include various content retrieved from the one or more data storage devices 154, 156. As used herein, "portal" is not limited to general-purpose Internet portals, such as YAHOO! or GOOGLE but also includes GUIs that are of interest to specific, limited audiences and that provide the party access to a plurality of different kinds of related or unrelated information, links and tools as described below. "Webpage" and "website" may be used interchangeably herein.

A party may gain access to source data access system 150 by using a device 108, 110, 164, programmed with a Web browser or other software, to locate and select (such as by clicking with a mouse) a particular webpage. The content of the webpage is located on the one or more data storage devices 154, 156. The party devices 108, 110 may be microprocessor-based computer terminals, pagers that can communicate through the Internet using the Internet Protocol (IP), Kiosks with Internet access, connected personal digital assistants or PDAs (e.g., a PALM device manufactured by Palm, Inc., IPAQ device available from Compaq, iPHONE from Apple or BLACKBERRY from RIM), or other devices capable of interactive network communications, such as an electronic personal planner. Party devices 108, 110 may also be wireless devices, such as a hand-held unit (e.g., a cellular telephone or a portable music player such as an iPod) that connect to, and communicate through, the Internet using a wireless access protocol (WAP).

The system and method described herein may be implemented by utilizing at least a part of the system 150 described above in connection with FIG. 1. It should be apparent to one of ordinary skill in the art that the system may be incorporated in a LAN, in a WAN, or through an Internet 114 based approach, such as through a hosted or non-hosted application service, or through a combination thereof. The functionality of the method may be programmed and executed by at least one computer processor unit 152, with necessary data and graphical interface pages as described below stored in and retrieved from a data storage unit 154, 156. A party can access this functionality using a party device 108, 110.

As mentioned above, source data access system 150 may provide separate features and functionality for front-end users, including customers and source data access service providers, as well as back-end users that manage the source data access system 150. For the purposes of this document, a "customer" is an individual or business or organization that signs up for or otherwise takes advantage of a source data custodian service, and a "source data access service provider" is an individual or business or organization, such as a financial institution, that provides one or more source data access services to customers and third parties. Accordingly, the customers are actual customers of the source data custodian service providers.

Figure 2:
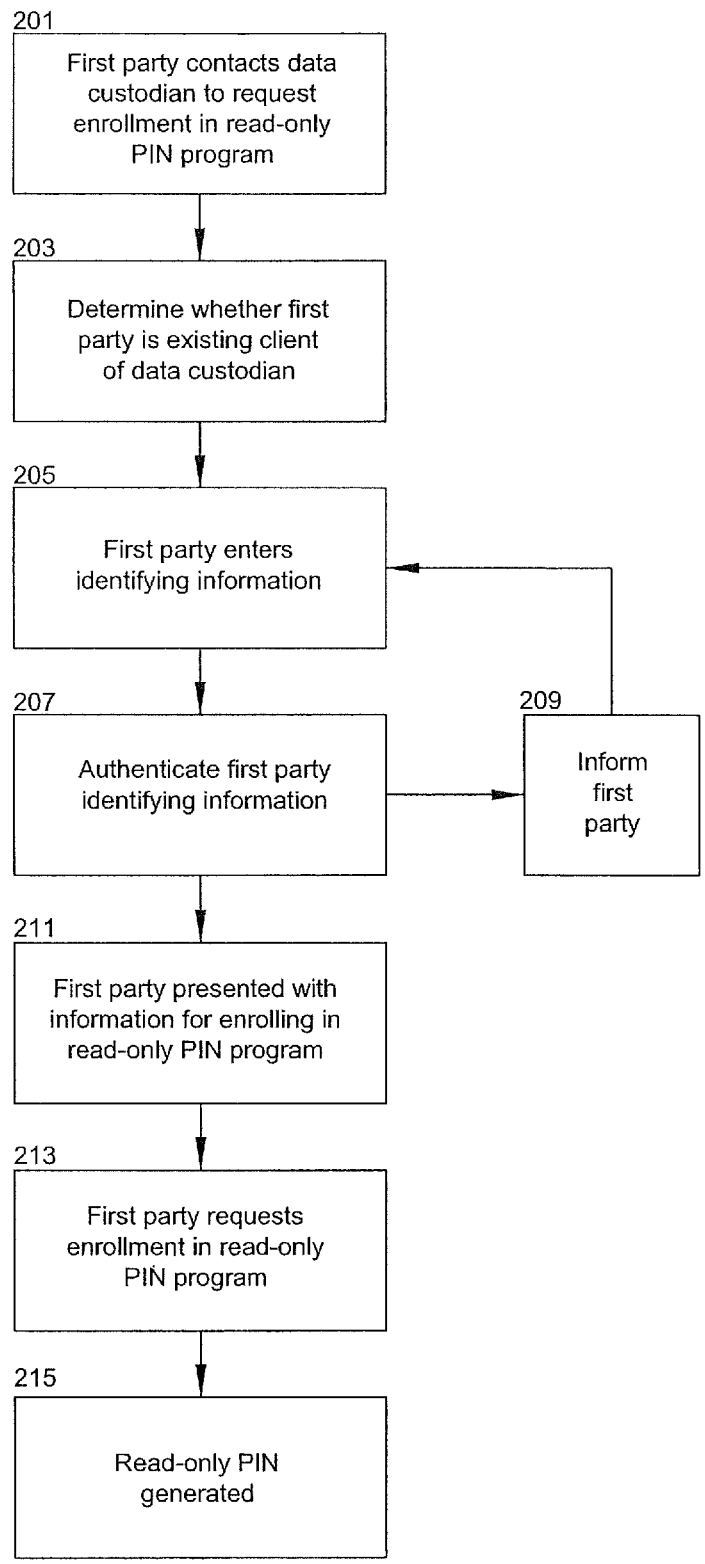
FIG. 2 is a flow chart for a method for providing access to data of a first party according to an embodiment of the disclosure.

With attention now drawn to FIG. 2, a flow diagram 200 for a method for providing access to data of a first party according to an embodiment of the disclosure is presented. In FIG. 2, at block 201 a first party, such as a customer of a data custodian, may contact a data custodian to request enrollment in a Read-Only Personal Identification Number (PIN) program, from the data custodian. For example, the Read-Only PIN may be a virtual authentication credential for accessing a first party's source data stored with a data custodian or with the first party. As can readily be appreciated, the present disclosure is applicable to a number of limited access credentials, and that a personal identification number (PIN) is only an exemplary form of a limited access credential that is contemplated by the present invention.

One skilled in the art will recognize that the first party may request enrollment in a Read-Only PIN program by contacting the data custodian through a wide variety of methods including, but not limited to, telephone, electronic mail, physical mail or by entering the data custodian's electronic system for a Read-Only PIN program. As described above, the data custodian's electronic system for the Read-Only PIN program may be a website provided by the data custodian's source data access system 150 that the first party and other parties may access via a public or private network. The first party may enter the website a number of ways (i.e., the customer's entrance into the data custodian's website may be "path sensitive", which may have implications as discussed further below) such as via a public network, via a link from another account the first party may have with the data custodian, via a notice or alert sent to the first party by the data custodian, via an e-mail advertisement sent to the first party by the data custodian, in response to a receipt of a promotional advertisement, etc.

At block 203, a determination may be made as to whether the first party is an existing client of the data custodian. In an embodiment, a determination may be made as to whether the first party is an existing online client of the data custodian. This determination may be based on information from block 201 or other information provided by the first party or from another source, including records or files possessed by, or stored at, the data custodian, including, but not limited to, at data storage units 154, 156. In an embodiment, the determination at block 203 may be made as to whether the first party is an existing offline client of the data custodian or both an online and offline client of the data custodian. An offline client may include the situation where the first party currently does business with the data custodian but not through the data custodian's online system.

If the first party is an existing online client of the data custodian, then at block 205, the first party enters information (which may sometimes be referred to herein as information for identifying a party or information for identifying a customer) such as, for example, a username and password. This information may typically be entered and transmitted to the data custodian using a computer such as, for example, through a customer's terminal 108, 110 or local computer 164. Alternatively, as would be understood by those of skill in the art, other information may be entered or used in place of a username and password. For example, the information for identifying a first party may include the first party's name, the first party's mailing address, the first party's electronic mailing address, the first party's account number, the first party's social security number, the first party's bank's name, the first party's bank's identification number, the first party's bank's routing transit number, the website login information assigned to the first party by the data custodian or selected by the first party when creating an online account with the data custodian, the first party's account number with the data custodian, a digital signature, information stored in a security token such as a soft token, hard token, key fob, or the like, a personal identification number (PIN), source IP address, a session identification, a session start time, a knowledge based authentication (KBA) status or any combination thereof. In an embodiment, since the first party is an existing online client of the data custodian only a limited amount or portion of information need be entered by the first party. In an exemplary embodiment, the information sent between the first party and the financial institution is encrypted using a network security protocol known in the art such as, for example, Secure Socket Layer (SSL) or Transport Layer Security (TLS). If the first party is an existing offline client of the institution, the customer provides identifying information, at block 205, such as, for example, the first party's name, first party's mailing address, the customer's electronic mailing address, the customer's account number, the first party's social security number, the first party's bank's name, the first party's bank identification number, the first party's bank's routing transit number, telephone call-in information assigned to the first party by the data custodian or selected by the first party during account set-up, a call-in password, a call-in PIN, or any combination thereof. In an embodiment, since the first party is an existing offline client of the financial institution, only a limited amount or portion of information need be entered or provided by the first party.

At block 207, the information provided by the first party at block 205 may be authenticated by any appropriate method known in the art. For example, the information provided by the first party at block 205 may be compared to information stored for the first party in records or files possessed by, or stored with, the data custodian, including, but not limited to, in a computer database at data storage units 154, 156. If the information provided by the first party at block 205 is not authenticated, the data custodian may inform the first party that the information provided at block 205 is incorrect by any appropriate method known in the art including, for example, by displaying an error message on the first party's computer screen at block 209 and looping the process back to block 205. If the information provided by the first party at block 205 is authenticated, then the data custodian may, at block 211, present to the first party (e.g. by displaying information on a webpage presented to the first party) at, for example, the first party's terminal 108, 110 or local computer 164, information for requesting enrollment in the Read-Only PIN program. In an embodiment, the data custodian may provide to the first party at block 211, information for requesting enrollment in the Read-Only PIN program by telephone, electronic mail, physical mail, or any other correspondence mechanism.

The information for requesting enrollment in the Read-Only PIN program presented to the customer at block 211 may be dynamically presented based at least partially on the information provided by the customer at block 201 or 205 or from another source, including records or files possessed by, or stored at, the financial institution, including, but not limited to, at data storage units 154, 156. For example, the information for requesting enrollment in the Read-Only PIN program may include a type of account held by the customer at the data custodian including, but not limited to, a savings account, checking account, credit card account, money market account, mutual funds account, brokerage account, IRAs, retirement account, etc. In another embodiment, the information for requesting enrollment may include a type of source data stored by the data custodian including, but not limited to, sales receipts, expenses, invoices, sales tax records, financial statements and reports, purchase orders, inventory records, electronic payment records, marketing statements or reports, payroll records, distribution records, billing records, accounting records, timesheet records, forecast data reports, transaction history statements and reports, merchant account fund reports, loan records, insurance policies, personal information, account summaries, frequent flier records and reports, electronic bills, stock or mutual fund performance and value statements and reports, trip itineraries, personal contacts, meta data, etc. In an embodiment, the information for requesting enrollment in the Read-Only PIN program may include the name of the primary account holder, the name of a joint account holder, an account number of a checking, savings, money market, mutual funds, brokerage, IRA, retirement or other account, a physical or electronic mailing address of the first party, terms and conditions for enrolling in the Read-Only PIN program, etc. The terms and conditions, as is known in the art, typically includes information appropriate for a product to be selected or ordered by a customer, in this case at block 211, and may include information, such as, but not limited to, joint service agreements, privacy statements, payment requirements, duration of program, etc. In an embodiment, the information for requesting enrollment in the Read-Only PIN program may include an option for renewal of a current or recently expired enrollment in the Read-Only PIN program. In an embodiment, the first party may be asked to verify the accuracy of the information presented at block 211 and/or accept terms and conditions presented at block 211 prior to requesting enrollment in the Read-Only PIN program. In a further embodiment, the first party may perform edits to the information presented at block 211 to ensure accuracy. In another embodiment, the information for requesting enrollment in the Read-Only PIN program may include a link to an outside party provider site, including but not limited to, a data aggregator, financial institution, data miner or data custodian service provider. At block 213, the first party makes a selection from the information for enrolling in the Read-Only PIN program provided or presented at block 211 and requests enrollment in the Read-Only PIN program.

Upon receipt of the request from the first party, at block 215, at least one Read-Only PIN is generated by the data custodian. As used herein, a Read Only PIN is a virtual authentication credential, randomly, pseudo-randomly or otherwise generated by the data custodian by any appropriate method known in the art, including at least one or more of a number, letter or symbol, or combination thereof, and that is designed to provide a third party with access to at least a portion of the source data of the first party. For example, a Read-Only PIN generated at the request of a first party may be generated as "6974e2". In an embodiment of the present invention, computer processing unit 152 may be programmed to execute a Read-Only PIN generating algorithm that returns a sequence of apparently non-related numbers, letters, symbols or combinations thereof each time the program is called. In an alternate embodiment, the Read-Only PIN may be generated by a secure operating system operating on a first party's microprocessor-based computer terminal or device. The Read-Only PIN provides an additional layer of security by preventing the second party from having or requiring knowledge of any further information for identifying the first party.

Figure 3:
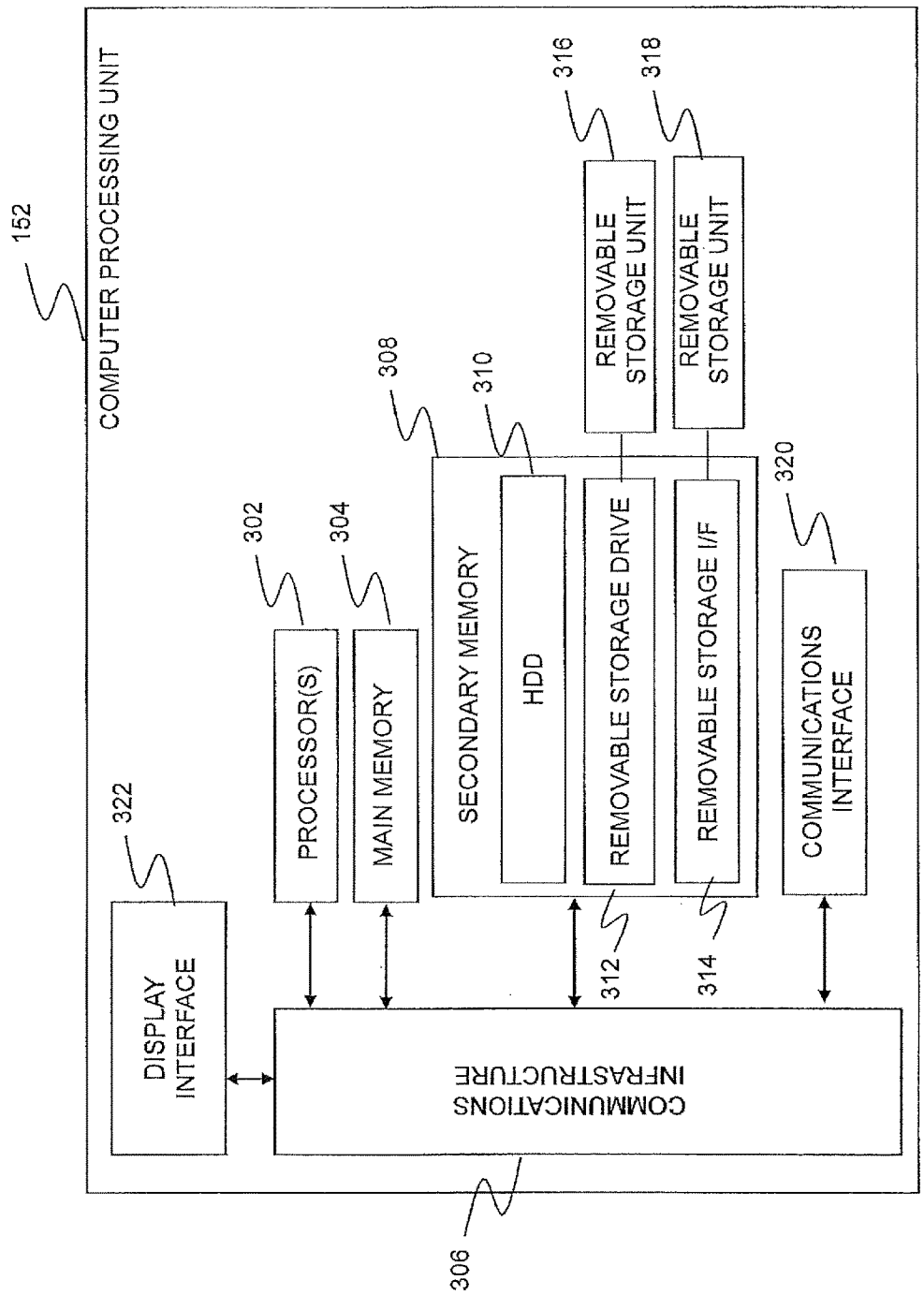
FIG. 3 is a diagram of an illustrative example of an architecture of a computer processing unit with the present invention.

FIG. 3 illustrates an example of an architecture of a computer processing unit 152 configured to implement the algorithms and software programming associated with the present disclosure. As illustrated in FIG. 3, computer processor unit 152 may include one or more processors 302. The processor 302 is connected to a communication infrastructure 306 (e.g., a communications bus, cross-over bar, or network). As discussed above, computer processing unit 152 may include a display interface 422 that forwards graphics, text, and other data from the communication infrastructure 406 (or from a frame buffer not shown) for display on the front- and back-end GUIs 158, 160, 162 and as retrieved from the one or more data storage devices 154, 156.

Computer processing unit 152 may also include a main memory 304, such as a random access memory (RAM), and a secondary memory 308. The secondary memory 308 may include, for example, a hard disk drive (HDD) 310 and/or removable storage drive 312, which may represent a floppy disk drive, a magnetic tape drive, an optical disk drive, or the like. The removable storage drive 312 reads from and/or writes to a removable storage unit 316. Removable storage unit 316 may be a floppy disk, magnetic tape, optical disk, or the like. As will be understood, the removable storage unit 316 may include a computer readable storage medium having stored therein computer software and/or data.

In alternative embodiments, secondary memory 308 may include other similar devices for allowing computer programs or other instructions to be loaded into computer processing unit 152. Secondary memory 308 may include a removable storage unit 318 and a corresponding interface 314. Examples of such removable storage units include, but are not limited to, USB or flash drives, which allow software and data to be transferred from the removable storage unit 318 to computer processing unit 152.

Computer processing unit 152 may also include a communications interface 320. Communications interface 320 allows software and data to be transferred between computer processing unit 152 and external devices. Examples of communications interface 320 may include a modem, Ethernet card, wireless network card, a Personal Computer Memory Card International Association (PCMCIA) slot and card, or the like. Software and data transferred via communications interface 320 may be in the form of signals, which may be electronic, electromagnetic, optical, or the like that are capable of being received by communications interface 320. These signals may be provided to communications interface 320 via a communications path (e.g., channel), which may be implemented using wire, cable, fiber optics, a telephone line, a cellular link, a radio frequency (RF) link and other communication channels.

In this document, the terms "computer program medium" and "computer readable storage medium" refer to media such as removable storage drive 312, or a hard disk installed in hard disk drive 310. These computer program products may provide software to computer processing unit 152. Computer programs (also referred to as computer control logic) are stored in main memory 304, secondary memory 308 and/or data storage devices 154, 156. Computer programs may also be received via communications interface 320. Such computer programs, when executed by a processor, specifically enable the computer processing unit 152 to perform features of the methods discussed herein. For example, main memory 304, secondary memory 308, data storage devices 154, 156 or removable storage units 316 or 318 may be encoded with computer program code for performing the Read-Only PIN generating algorithm.

In an embodiment implemented using software, the software may be stored in a computer program product and loaded into computer processing unit 152 using removable storage drive 312, hard drive 310, or communications interface 320. The software, when executed by a processor 302, causes the processor 302 to specifically perform the functions of the Read-Only PIN generating algorithm described herein. In another embodiment, the Read-Only PIN generating algorithm may be implemented primarily in hardware using, for example, hardware components such as a digital signal processor comprising application specific integrated circuits (ASICs). In yet another embodiment, the Read-Only PIN generating algorithm is implemented using a combination of both hardware and software.

As discussed above, at block 215, the data custodian may generate a Read-Only PIN by any appropriate method known or used in the art. For example, it is well-known in the art to program and execute a standard C RAND or RAND_S function, or the PHP hyperext preprocessor functions microtime or mt_rand, or the Unix function /dev/random, or the Java function SecureRandom, to return a pseudorandom number or alphanumeric sequence within a specified range. It is understood that a pseudorandom number or alphanumeric sequence generator should produce a pseudorandom sequence with a period that is long enough so that a finite sequence of reasonable length is not periodic. It is also well known that all pseudorandom number or alphanumeric sequence generators have an internal memory or state and that the size of the state is the value that determines the strength of the pseudorandom number or alphanumeric sequence generator, where an n-bit state can produce at most $2^n$ different values. The strength, or ability of the pseudorandom sequence generator to resist a brute force attack by a cryptanalyst, of the output of the pseudorandom number or alphanumeric sequence generator is also commonly associated with the information entropy of the process that produced the pseudorandom sequence. This information entropy (H) is conventionally measured in bits and is commonly calculated as: $H = L \log_2 N$ where L is the number of letters, numbers or symbols in the sequence and N is the number of possible letters, numbers or symbols. See, e.g. National Institute of Standards and Technology Special Publication 800-63, Electronic Authentication Guideline, Appendix A; Bruce Schneier, Applied Cryptography, John Wiley & Sons, 1996, Chapter 11, Mathematical Background, p. 233-237. For example, in a pseudorandom alphanumeric sequence, where each alphanumeric character in the sequence is produced independently, and where the number of possible letters, numbers or symbols includes all letters in the Latin alphabet from a-z (26), A-Z (26) and all Arabic numerals from 0-9 (10), the entropy per symbol would be calculated as $H = \log_2 N$ or $\log_2 (52)$ or 5.70 bits per symbol. It is well known in the art to select L and N based on a desired information entropy, thus, one skilled in the art would understand to select those values for the Read-Only PIN based on a desired information entropy.

It is also understood that to be cryptographically secure, a pseudorandom sequence must be unpredictable where a secret key, or seed, is used to set the initial state of the pseudorandom sequence generator. Key management of the secret key or seed may be implemented by the data custodian in any method known in the art and should be at least in compliance with the financial industry standards set forth by the Accredited Standards Committee X9. In addition to employing a secret key, there are a wide variety of known methods to generate the seed for pseudorandom sequence generation. For example, the standard C function RAND may be seeded using the time function, although time of day is often not used as a seed due to its susceptibility to cryptographic attacks. Additionally, by way of example, Open SSL may use the function RAND_screen( ) to hash the contents of the screen to generate a seed. Further by way of example, the Linux random number generator may collect data from a variety of sources, including mouse, keyboard and other interrupts to seed a random number generator. Furthermore, it is well known in the art to combine the seed and a counter output and hash the output with a one-way hashing functions such as MD5 or SHA-1 to generate a cryptographically secure pseudorandom sequence. In an embodiment, at block 215, may be generated by a secure operating system operating on a first party's microprocessor-based computer terminal or device.

Figure 4:
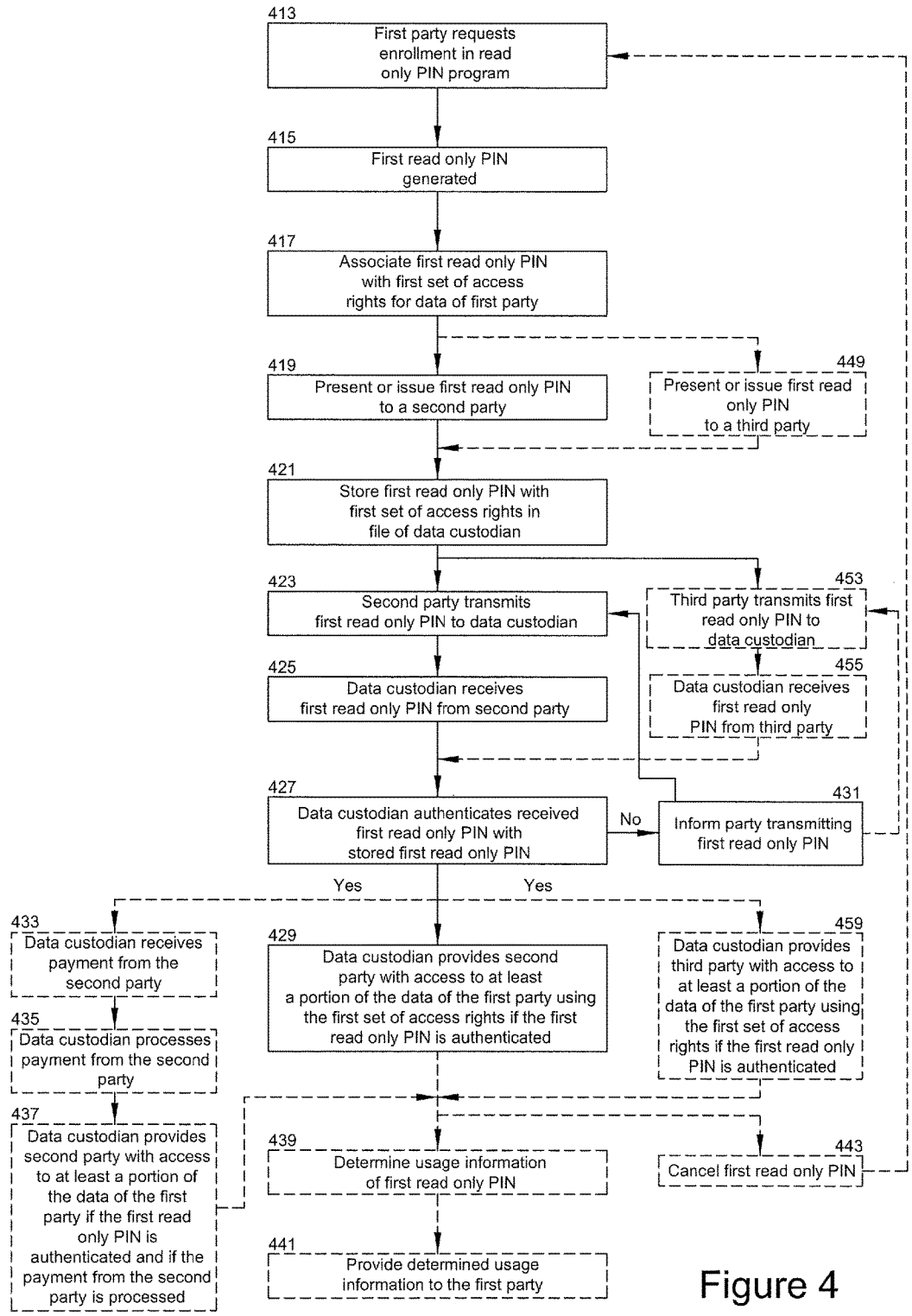
FIG. 4 is a flow chart showing a method for providing access to data of a first party according to an embodiment of the present invention.

FIG. 4 illustrates a flow chart describing a method for providing limited access to data of a first party according to an embodiment of the present invention. In the present embodiment and as discussed above, the first party may request enrollment in the Read-Only PIN program at block 413. Upon receipt of the request from the first party, at block 415, a first Read-Only PIN is generated by the data custodian using any appropriate method known or used in the art. At block 417, the first Read-Only PIN may be associated with a first set of access rights for the data of the first party. In an embodiment, the first set of access rights may be selected by the first party based on the type of account held by the first party with the data custodian or the type of source data of the first party stored by the data custodian in records or files possessed by, or stored with, the data custodian, including, but not limited to, in a computer database at data storage units 154, 156. In an embodiment, the first set of access rights may be selected by the first party based on the identity of a third party receiving the Read-Only PIN. The first set of access rights to the source data of the first party may include, but are not limited to, rights to read the data, rights to view the data, rights to modify the data, rights to manipulate the data, rights to download the data, rights to upload the data, rights to transfer the data, rights to share the data, rights to aggregate the data, rights to mine the data, rights to analyze the data, access rights to a subset of the data, duration of access rights to the data, time of access rights to the data, payment requirements for receiving access rights to the data, terms and conditions for the data, and combinations thereof. For example, the source data may be divided or partitioned into smaller subsets of data such that the first set of access rights may include varying level of access rights depending on the content of the source data in a subset. In an embodiment, the first set of access rights may include rights to view the source data and rights to modify a subset of the source data. For example, if the source data included information regarding a first party's savings account, brokerage account and credit card account, the first set of access rights may include rights to view the source data related to the savings account, rights to manipulate the source data related to the brokerage account and no rights related to the credit card account. The first set of access rights may include a limited lifetime or duration of use, where the first set of access rights, or a portion of the first set of access rights, would cease after expiration of a period of time or number of uses. The first set of access rights may include payment requirements for receiving access rights to the source data. For example, a third party data mining service provider may want the first set of access rights to include rights to view sales receipts, invoices, purchase orders, inventory records and electronic payment records of the first party to analyze buying patterns in a geographical area. The first party or data custodian may select the first set of access rights to include the access rights requested by the third party data mining service provider with payment requirements for receiving the requested access rights. In an embodiment, the first set of access rights may be billable to the third party.

At block 419, the first Read-only PIN may be presented, issued, transmitted or otherwise communicated to a second party over the Internet 114 or by any correspondence mechanism known in the art. The second party may include, but is not limited to, a data aggregator, data aggregation service provider, data comparison aggregator, financial institution, brokerage firm, online trading service provider, online banking service provider, data mining service provider, individual and business accounting service provider such as Intuit or interested individuals, businesses or other parties. In an embodiment, the second party may include one or more parties including the above or combinations thereof. In an embodiment, at block 449, the first Read-Only PIN is issued, presented, transmitted or otherwise provided to a third party. A third party may be a party distinct from the second party and may also include, but is not limited to, a data aggregator, data aggregation service provider, data comparison aggregator, financial institution, brokerage firm, online trading service provider, online banking service provider, data mining service provider, individual and business accounting service provider such as Intuit or interested individuals, businesses or other parties. In an embodiment, the second party and/or third party may include a family member, friend, business partner, co-worker, colleague, contractor, employee, or employer of the first party. For example, the first Read-only PIN may be associated with a first set of access rights including the rights to view a savings account of a first party for an upcoming family vacation, or the rights to view a 529 college savings plan, and issued to various family members who will be contributing to and participating in the family vacation or the recipient of the college savings plan.

In an embodiment at block 419, and similarly block 449, the first Read-Only PIN is communicated to the second party or third party computer system network 102 which, as discussed above, may include a corresponding computer processor unit 104 of the second party or third party, which is coupled to a corresponding local data storage unit 106 of the second party or third party and to local network party terminals 108. In an exemplary embodiment, the Read-Only PIN is communicated using a network security protocol known in the art such as SSL or TLS where the information sent between the data custodian and second and/or third party is encrypted. As is understood in the art, a network security protocol may use encrypted sessions to protect confidential data as it traverses the public Internet 114. The Read-Only PIN may be communicated with instructions for contacting the data custodian to access the source data of the first party including, but not limited to, a website address or IP address, instructions for accessing the source data once contact has been established with the data custodian, and may also be communicated with a summary of the first set of access rights associated with the Read-Only PIN.

In an embodiment, the first Read-only PIN may be stored in a computer readable medium including, for example, a security token such as a soft token, hard token, key fob, or the like. In an embodiment, at block 419 and similarly at block 449, the first Read-only PIN may be issued to an address of the second party and/or third party stored or possessed by the data custodian at, for example, records or files at data storage units 154, 156. The address of the second party or third party may include, but is not limited to, a physical mailing address or electronic mailing address. In an embodiment, the first party may be requested to specify or verify the physical mailing address or electronic mailing address that is stored or possessed by the data custodian prior to requesting enrollment in the Read-Only PIN program at block 413. In an embodiment, at block 419, the first party may select, specify or verify a second party for receiving the Read-Only PIN, the first set of access rights associated with the second party and/or third party and the address of the second party and/or third party. The Read-Only PIN may be issued with instructions to the second party or third party. In an embodiment, the Read-Only PIN may be issued with information to specify the identity of the first party. The instructions may also include information for contacting the data custodian to access the source data of the first party including, but not limited to, a website address or IP address, may also include information for accessing the source data once contact has been established with the data custodian, and/or may also include a summary of the first set of access rights associated with the Read-Only PIN. In an embodiment, the first Read-only PIN may be presented, issued, transmitted or otherwise provided to a second party and/or third party by the first party. In an embodiment, at block 419, and similarly at block 449, the first Read-Only PIN may be presented to the second party, and/or third party dynamically, for example by displaying information on a webpage presented to the second and/or third party at, for example, the second and/or third party's terminal 108. The second party and/or third party may receive the first Read-Only PIN and store the received Read-Only PIN at, for example, a local storage unit 106.

At block 421, the first Read-Only PIN associated with the first set of access rights is stored with the first set of access rights in a file stored or possessed by the data custodian at, for example, records or files at data storage units 154, 156. For example, the first Read-Only PIN may be stored in a computer database with an access control matrix, computer system security policy, or a filesystem access control configuration including a table of the first set of access rights associated with the first Read-Only PIN at block 417. It is understood that a filesystem access control configuration may include any configuration known in the art to establish and associate the first set of access rights with the first Read-Only PIN including, but not limited to, setuid in UNIX, access control lists (ACL) for Windows® systems, or hybrid systems including ACL and capability storage approaches for UNIX, Linux and OSX.

At block 423, the second party transmits the first Read-only PIN to a data custodian. The data custodian may be the custodian that issued the first Read-Only PIN to the second party. The second party may communicate with the data custodian according to the instructions provided to the second party with the first Read-only PIN. In an exemplary embodiment, the first Read-Only PIN is communicated from the second party to the data custodian using a network security protocol known in the art such as SSL or TLS where the information sent between the second party and the data custodian is encrypted. Similarly, at block 453, a third party may transmit the first Read-only PIN to a data custodian.

At block 425, the first Read-Only PIN provided by the second party at block 423 may be received by the data custodian based on the method for transmission employed by the second party at block 423. Similarly, at block 455, the first Read-Only PIN provided by the third party at block 453 may be received by the data custodian based on the method for transmission employed by the third party at block 453. At block 427, the first Read-Only PIN received by the data custodian at block 425 may be authenticated by any appropriate method known in the art. For example, the first Read-Only PIN may be compared to the first Read-Only PIN stored for the first party in records or files possessed by, or stored at, the data custodian, including, but not limited to, at data storage units 154, 156. If the received first Read-Only PIN is not authenticated, the data custodian may inform the second party and/or third party that the first Read-Only PIN provided at block 423 is incorrect by any appropriate method known in the art including, for example, by transmitting and/or displaying an error message on a computer terminal 108 of the second party and/or third party at block 431 and looping the process back to block 423 or 453 as appropriate.

If the first Read-Only PIN received by the data custodian at block 425 is authenticated, then the data custodian may, at block 429, provide the second party with access to at least a portion of the data of the first party using the first set of access rights. In an embodiment, the source data of the first party may be stored in a first record or file possessed by, or stored at, the data custodian, including, but not limited to, at data storage units 154, 156 and the portion of the source data of the first party, such as a subset of the source data, that is associated with the first Read-Only PIN may be stored in a second record or file possessed by, or stored at, the data custodian. In an embodiment, the subset of the source data may be stored in a secure or encrypted file of the data custodian, such as, for example, a Triple DES encrypted "digital safe". The secure file may be stored in a separate data storage unit, and/or may be accessed only by a separate server than the portion of the source data not associated with the first Read-Only PIN.

For example, a second party may be a customer's brokerage firm, the first Read-Only PIN may be a Read-Only PIN issued to the brokerage firm by a financial institution and the first set of access rights may include rights to view information regarding a customer's savings account with the financial institution and the rights to update information regarding a customer's online trading account with the financial institution. In the present example, to access the first party's source data associated with the first set of access rights, the brokerage firm transmits the first Read-Only PIN to the financial institution. The financial institution may have software stored in a computer program product and loaded into computer processing unit 152 using removable storage drive 312, hard drive 310, or communications interface 320 such that, when executed by a processor 302, causes the processor 302 to receive and authenticate the received Read-Only PIN. In the present example, the received Read-Only PIN may be compared to a table including the first Read-Only PIN and the first set of access rights and stored in a computer file at the financial institution, including, but not limited to, at data storage units 154, 156. The software may include a filesystem access control configuration for the first Read-Only PIN such that when executed by a processor 302, causes the brokerage firm to be given rights to view information regarding a customer's savings account with the financial institution and rights to update information regarding a customer's online trading account according to the stored first set of access rights. Similarly, at block 459, the data custodian may provide a third party with access to at least a portion of the data of the first party using the first set of access rights if the received first Read-Only PIN is authenticated.

As discussed above, the first set of access rights may include payment requirements for receiving access rights to the source data. In an embodiment, a second party may request that the first set of access rights include specific rights for performing a desired function such as, for example, data aggregation or data mining. In the present embodiment, the first party or data custodian may select the first set of access rights to include the access rights requested by the second party with payment requirements for receiving the requested access rights. The payment requirements may provide access to the portion of the source data associated with the first set of access rights for a limited time, duration, number of accesses, or the like, in exchange for a payment from the second party. At block 417, the data custodian may associate the first Read-Only PIN with the first set of access rights including the payment requirements for receiving access to the source data of the first party. In the subject embodiment, at block 433, the data custodian may receive a payment from the second party by any means understood in the art. At block 435, the data custodian may process the received payment. At block 437, and as described above, the data custodian may provide the second party with access to at least a portion of the source data of the first party, using the first set of access rights if the first Read-Only PIN is authenticated and if the payment from the second party is processed. In another embodiment, the data custodian may provide the second party with access to at least a portion of the source data of the first party, using the first set of access rights if the first Read-Only PIN is authenticated and if the payment from the second party is received.

At block 439, the data custodian may determine usage requirements for the first Read-Only PIN. For example, and as described above, the data custodian may log all uses of the first Read-Only PIN and may put in place an audit trail for the first Read-Only PIN. For example, the data custodian may log a date-time stamp with the authentication of the first Read-Only PIN. In another example, the data custodian may provide a serial number with the authentication of the first Read-Only PIN for auditing purposes. At block 441, the data custodian may provide this determined usage information to the first party. In an embodiment, the data custodian may make this log available to the first party. The data custodian may provide monitoring of the usage of the Read-Only PIN and provide alerts to the first party based on usage activity. The data custodian may monitor anomalous activity, such as, for example, unsuccessful authentication attempts of the first Read-Only PIN, and provide alerts to the first party based on anomalous usage activity. The data custodian may provide the first party with historical usage information including the date and time that the source data or a subset of the source data was accessed, or the data and time that the first Read-Only PIN was authenticated. The data custodian may provide the first party with usage information such as the number of times that the source data or a subset of the source data was accessed, or the number of times that the first Read-Only PIN was authenticated.

At block 443, the data custodian may cancel the first Read-Only PIN. The data custodian may cancel the first Read-Only PIN to prevent access by the second party and/or the third party to the at least a portion of the source data of the first party associated with the first set of access rights of the first Read-Only PIN. The first party may request cancellation of the first Read-Only PIN by contacting the data custodian. In an embodiment, the first party may contact the data custodian at any time to decline enrollment, or suspend participation, in the Read-Only PIN program The first party may select a lifetime or duration of use for the first Read-Only PIN and direct the data custodian to cancel the first Read-Only PIN upon expiration of the lifetime or duration. In an embodiment, and as discussed above, the first set of access rights may include a limited lifetime or duration of use, where the first set of access rights, or a portion of the first set of access rights, would cease after expiration of a period of time or number of uses. In the present embodiment, the data custodian may cancel the first Read-Only PIN when the lifetime or expiration of the first set of access rights expires. The first Read-Only PIN may be automatically cancelled after a limited number of accesses by the second party and/or the third party. The first Read-Only PIN may be automatically cancelled if the second or third party fails to make a payment within a data custodian or first party specified time, or upon expiration of a grace period after the payment deadline expires. In another embodiment, the first Read-Only PIN may be automatically cancelled when a logged date-time stamp for authentication of the first Read-Only PIN is compared with, and determined to be equal to or subsequent to, a stored expiration date-time stamp. In an embodiment, the first Read-Only PIN may be cancelled based on a second party and/or a third party exceeding a maximum number of failed authentication attempts. The data custodian may only cancel the first Read-Only PIN for a second party while keeping the first Read-Only PIN active for a third party. The second party and/or third party may be notified of the cancellation of the first Read-Only PIN by the data custodian by any means understood in the art.

In an embodiment, and as described above, the data custodian may generate a second Read-Only PIN. The first party may request the generation of the second Read-Only PIN by contacting the data custodian through a wide variety of methods including, but not limited to, telephone, electronic mail, physical mail or by entering the data custodian's electronic system for a Read-Only PIN program. As described above, the data custodian's electronic system for the Read-Only PIN program may be a website provided by the data custodian's source data access system 150 that the first party and other parties may access via a public or private network. As described above, the first party may enter the website a number of ways to request generation of the second Read-Only PIN. In an embodiment, the first party may request generation of the second Read-Only PIN after the first Read-Only PIN has been cancelled. The second Read-Only PIN may be associated with a second set of access rights for the data of the first party. The second set of access rights may be identical to a first set of access rights that were cancelled when a first Read-Only PIN was cancelled. In an embodiment, and as described above, the second set of access rights may be selected by the first party based on the type of account held by the first party with the data custodian or the type of source data of the first party stored by the data custodian in records or files possessed by, or stored with, the data custodian, including, but not limited to, in a computer database at data storage units 154, 156. In an embodiment, the second set of access rights may be selected by the first party based on the identity of a fourth party receiving the Read-Only PIN. In another embodiment, and as described above, the source data may be divided or partitioned into smaller subsets of data such that the second set of access rights may include varying level of access rights depending on the content of the source data in a subset. The first party or data custodian may select the second set of access rights to include the access rights requested by a fourth party. The fourth party may include, but is not limited to, a data aggregator, data aggregation service provider, data comparison aggregator, financial institution, brokerage firm, online trading service provider, online banking service provider, data mining service provider, individual and business accounting service provider such as Intuit, or an interested individual, business or other party. In an embodiment, the fourth party may include one or more parties including the above or combinations thereof. In an embodiment, the fourth party may be identical to the second party or the third party described above.

As described above at block 419, the second Read-Only PIN may be presented, issued, transmitted or otherwise communicated to a fourth party over the Internet 114 or by any correspondence mechanism known in the art. The second Read-Only PIN may be stored with the second set of access rights in a record or file of the data custodian as shown above at block 421. The fourth party may transmit the second Read-Only PIN to the data custodian as described above at block 423. The data custodian may receive and authenticate the received second Read-Only PIN with the stored second Read-Only PIN as described above at blocks 425 and 427. If the second Read-Only PIN is authenticated, the data custodian may provide the fourth party with access to at least a portion of the source data of the first party using the second set of access rights as outlined above at block 429.

Figure 5:
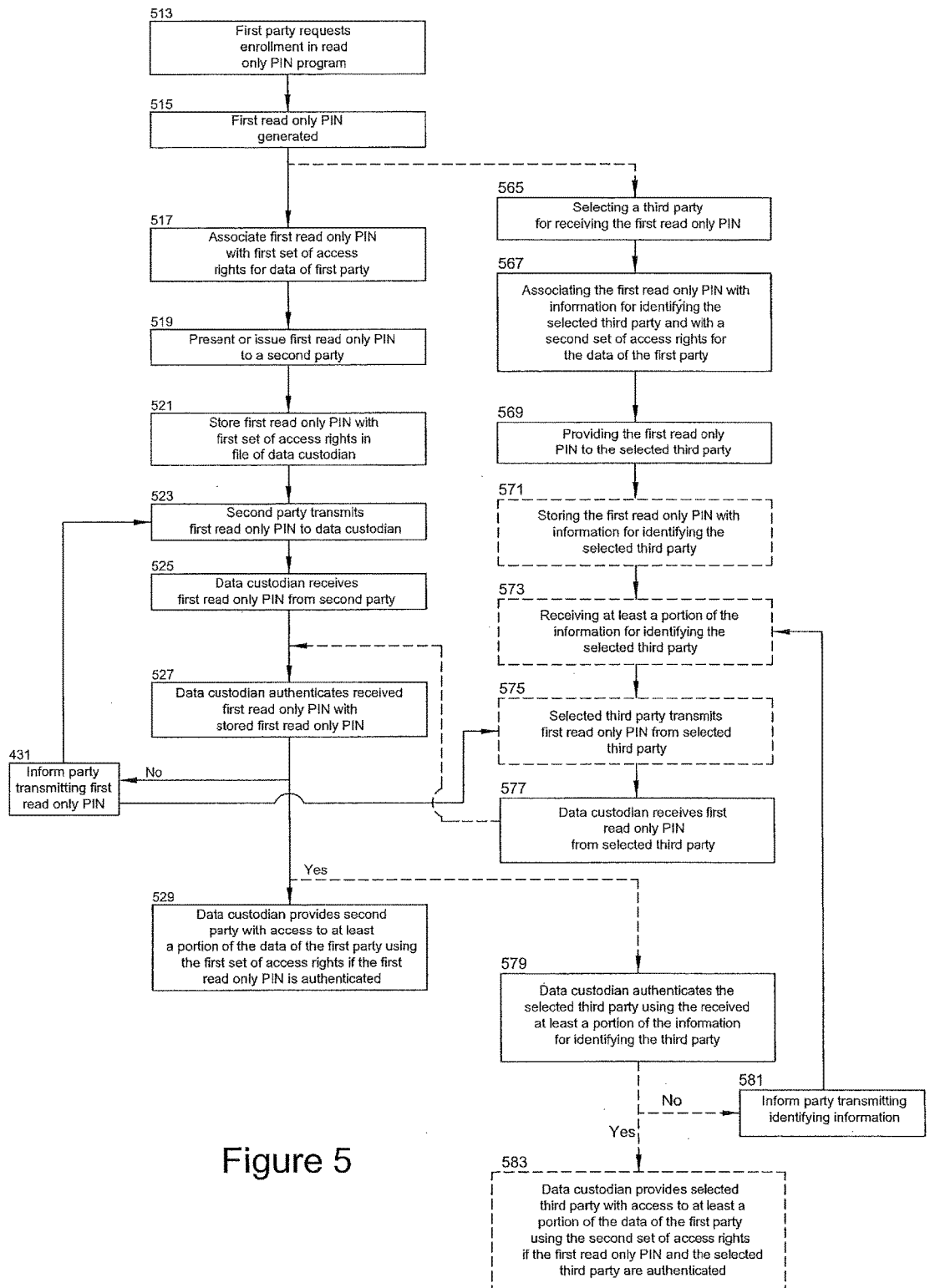
FIG. 5 is a flow chart illustrating a method for providing access to data of a first party according to an embodiment of the present invention.

With reference now to FIG. 5, a flow chart describing a method for providing limited access to data of a first party according to an embodiment of the present invention is shown. As described above, the first party may request enrollment in the Read-Only PIN program at block 513. Upon receipt of the request from the first party, at block 515, a first Read-Only PIN is generated by the data custodian using any appropriate method known or used in the art. At block 565, the first party may select a third party for receiving the first Read-Only PIN. For example, and with reference to FIG. 6, where an illustrative website screenshot according to an embodiment of the present invention is shown, the first party may be requested to enter identifying information about the third party and to specify the desired access rights for the third party. For example, the first party may enter the name of the company and the phone number of the company that they would like to add as a third party for receiving the first Read-Only PIN. In an embodiment, the data custodian may compare the received identifying information about the third party with information in records or files possessed by, or stored with, the data custodian, including, but not limited to, in a computer database at data storage units 154, 156. In an embodiment, the data custodian may present additional identifying information about the selected third party to the first party and request that the first party verify the identity of the selected third party. In an embodiment, the additional identifying information presented to the first party may include a link to a website for the selected third party. In another embodiment, the data custodian may request the first party provide additional identifying information about the selected third party. In a further embodiment, the data custodian may retrieve additional information about the selected third party including, but not limited to, a host name, Internet Protocol address or IP address, media access control address or MAC address, public key, digital certificate, or digital signature from any source known in the art including, for example, a certificate authority, a domain name system (DNS), address resolution protocol (ARP), dynamic host configuration protocol (DHCP), etc.

At block 565, and as illustrated in FIG. 6, a first party may select a second set of access rights associated with the selected third party. As described above, the selected second set of access rights to the source data of the first party may include, but are not limited to, rights to read the data, rights to view the data, rights to modify the data, rights to manipulate the data, rights to download the data, rights to upload the data, rights to transfer the data, rights to share the data, rights to aggregate the data, rights to mine the data, rights to analyze the data, access rights to a subset of the data, duration of access rights to the data, time of access rights to the data, payment requirements for receiving access rights to the data, terms and conditions for the data, and combinations thereof. As additionally described above, the source data may be divided or partitioned into smaller subsets of data such that the second set of access rights may include varying level of access rights depending on the content of the source data in a subset. In an embodiment, the second set of access rights may include rights to view the source data and rights to modify a subset of the source data.

For example, and as illustrated in FIG. 6, the source data may include accounts or information stored with a data custodian including, but not limited to, a checking account, savings account, credit card account, mutual fund account, brokerage account, automobile loan information, automobile insurance policy information, homeowner's insurance policy information, life insurance policy information or personal information on file with the data custodian. In an embodiment, the selected second set of access rights may include rights to view the source data related to the savings account, checking account and credit card account rights to update the source data related to the brokerage account and mutual funds account and no rights related to the insurance policy information or personal information on file with the data custodian. As described above, the selected second set of access rights may include a limited lifetime or duration of use, where the second set of access rights, or a portion of the first set of access rights, would cease after expiration of a period of time or number of uses. In an embodiment, the selected second set of access rights may include payment requirements for receiving access rights to the source data.

For example, the selected third party may be a party data mining service provider. In the present example, the data mining service provider may want or request information on the types of accounts and insurance policies held by a first party at a financial institution to analyze patterns of financial institution customers. The first party may select the second set of access rights to include rights to view the information requested by the third party data mining service provider, but exclude any rights to view specific information within each account or policy and personal information on file with the financial institution. The first party may also select the second set of access rights to include payment requirements for receiving the requested access rights. In an embodiment, the first set of access rights may be billable to the third party.

At block 517, the first Read-Only PIN may be associated with a first set of access rights for the data of the first party. At block 567, the first Read-Only PIN may also be associated with at least a portion of the information for identifying the selected third party and the selected second set of access rights for the source data of the first party. For example, the first Read-Only PIN may be associated with a name, IP address, digital certificate, or public key of the selected third party and the second set of access rights selected by the first party at block 565. At block 519, and similarly at block 569, the first Read-Only PIN is provided to the second party and the selected third party respectively, as described above. The first Read-Only PIN may be stored with the first set of access rights in a record or file of the data custodian as shown above at block 521. Similarly, at block, 571, the first Read-Only PIN may be stored with the associated information for identifying the selected third party and the selected set of access rights in a record of file of the data custodian. In an embodiment, the first Read-Only PIN and first set of access rights of the first party may be stored in a first record or file possessed by, or stored at, the data custodian, including, but not limited to, at data storage units 154, 156 and the first Read-Only PIN, selected second set of access rights and associated information for identifying the selected third party may be stored in a second record or file possessed by, or stored at, the data custodian. In an embodiment, the subset of the source data associated with the selected set of access rights, or first set of access rights, may be stored in a secure or encrypted file of the data custodian. As described above, the secure file may be stored in a separate data storage unit, and may be accessed only by a separate server than the portion of the source data not associated with the first Read-Only PIN.

The selected third party may attempt to access the source data associated with the selected second set of access rights of the first Read-Only PIN by contacting the data custodian by any method known in the art. For example, the selected third party may communicate with the data custodian according to instructions provided to the selected third party with the first Read-only PIN. In an exemplary embodiment, the selected third party may establish an SSL or TLS encrypted session with a data custodian via the Read-Only PIN program website of the data custodian. At block 573, the data custodian may receive at least a portion of the information for identifying the selected third party. For example, in an SSL handshake, the digital certificates, public keys and private keys of the selected third party and data custodian may be used to authenticate the identity of one or both parties involved in the SSL session using SSL mutual authentication or SSL single-end authentication. In an embodiment, the data custodian may receive the IP address or the MAC address of the selected third party. At block 523, the first Read-Only PIN is communicated from the second party to the data custodian. Similarly, at block 575, the selected third party may transmit the first Read-Only PIN to the data custodian as described above.

The data custodian may receive the first Read-Only PIN from the second party and/or selected third party as described above at blocks 525 and 577 and authenticate the received first Read-only PIN by any appropriate method known in the art. For example, the first Read-Only PIN may be compared to the first Read-Only PIN stored for the first party in records or files possessed by, or stored at, the data custodian, including, but not limited to, at data storage units 154, 156. As described above, if the received first Read-Only PIN is not authenticated, the data custodian may inform the party transmitting the first Read-Only PIN, at block 531, that the first Read-Only PIN provided at block 523 is incorrect by any appropriate method known in the art including, for example, by transmitting and/or displaying an error message on a computer terminal 108 of the transmitting party and looping the process back to block 523 or 575 as appropriate. If the first Read-Only PIN received by the data custodian at block 525 is authenticated, then the data custodian may, at block 529, provide the second party with access to at least a portion of the data of the first party using the first set of access rights. If the first Read-Only PIN received by the data custodian at block 577 is authenticated, the data custodian may authenticate the selected third party using the received information for identifying the selected third party and the stored information for identifying the selected third party stored with the first Read-Only PIN. If the selected third party is not authenticated, at block 581, the data custodian may inform the party transmitting the first Read-Only PIN at block 575, that the identity of the selected third party could not be authenticated by any appropriate method known in the art and loop the process back to block 573. If the selected third party is authenticated, the data custodian, at block 583, may provide the selected third party with access to at least a portion of the source data of the first party using the selected second set of access rights provide the fourth party with access to at least a portion of the source data of the first party using the second set of access rights as outlined above.

Figure 7:
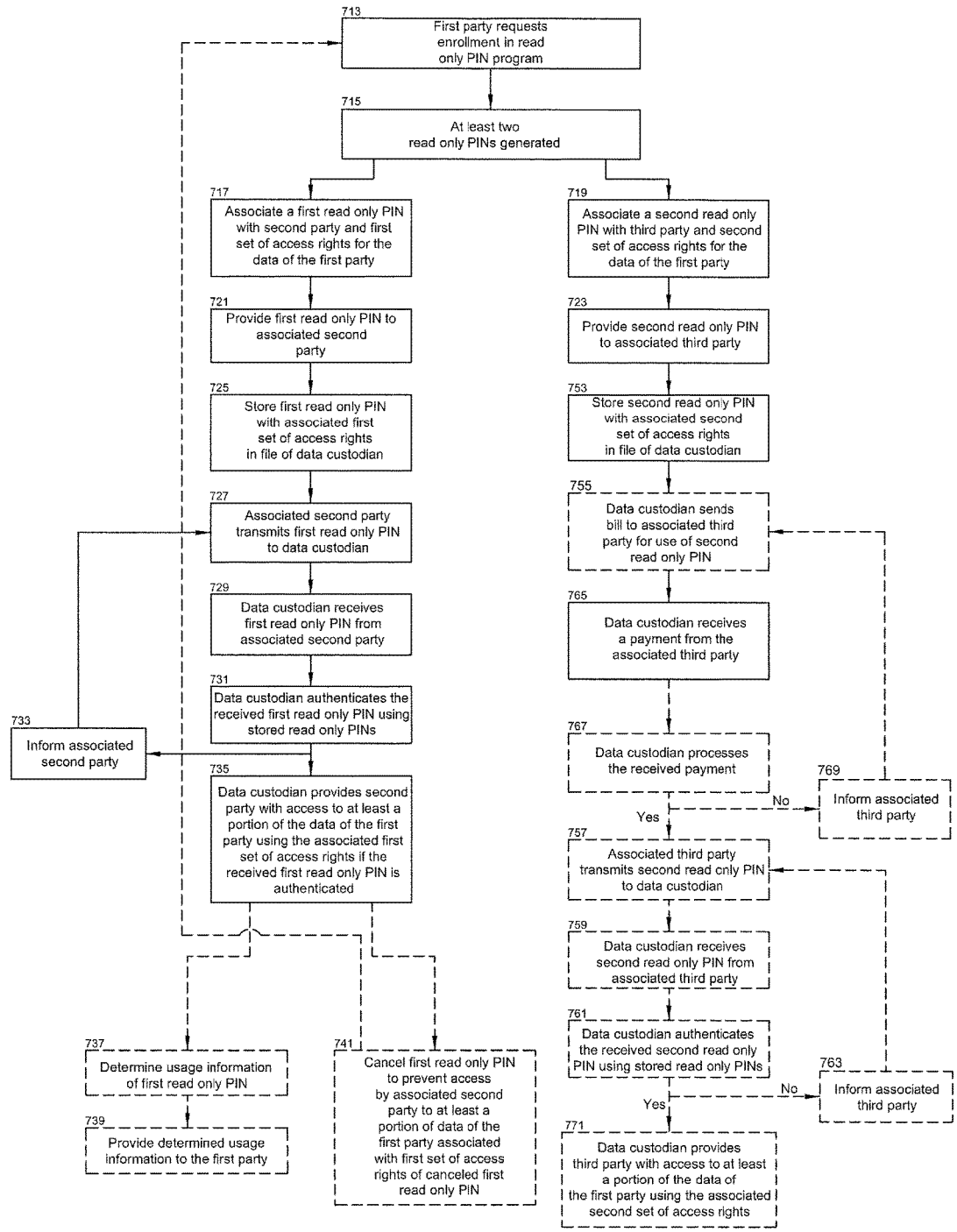
FIG. 7 is a flow chart showing a method for providing access to data of a first party according to an embodiment of the present disclosure.

With reference to FIG. 7, a flow chart showing a method for providing access to data of a first party according to an embodiment of the present disclosure is illustrated. At block 713, a first party requests enrollment in a data custodian's Read-Only PIN program as described above. Upon receipt of the request from the first party, at block 715, at least two unique Read-Only PINs are generated by the data custodian using any appropriate method known or used in the art. In an embodiment, each unique Read-Only PIN is associated with a unique party and a unique set of access rights for the data of the first party. At block 717, a first unique Read-Only PIN may be associated with a second party and a first set of access rights for the data of the first party. Similarly, at block 719, a second unique Read-Only PIN may be associated with a third party and a second set of access rights for the data of the first party.

In an embodiment, the first party may be requested to enter identifying information about the party to receive each unique Read-Only PIN and to specify the desired access rights for the party. For example, the first party may enter the name of a family member, friend or colleague that they would like to be associated with one of the unique Read-Only PINs. Additionally, by way of example, the first party may enter the name of the company and the phone number of the company that they would like to add as the unique party for receiving one of the unique Read-Only PINs. In an embodiment, the data custodian may compare the received identifying information about the unique party with information in records or files possessed by, or stored with, the data custodian, including, but not limited to, in a computer database at data storage units 154, 156. In an embodiment, the data custodian may present additional identifying information about each unique party to the first party and request that the first party verify the identity of each unique party. In another embodiment, the data custodian may request that the first party provide additional identifying information for each unique party. In a further embodiment, the data custodian may retrieve additional information about each unique party including, but not limited to, a host name, Internet Protocol address or IP address, media access control address or MAC address, public key, digital certificate, or digital signature from any source known in the art.

In an embodiment, the first party may be requested to select a unique set of access rights associated with each of the unique Read-Only PINs. As described above, each of the unique set of access rights to the source data of the first party may include, but are not limited to, rights to read the data, rights to view the data, rights to modify the data, rights to manipulate the data, rights to download the data, rights to upload the data, rights to transfer the data, rights to share the data, rights to aggregate the data, rights to mine the data, rights to analyze the data, access rights to a subset of the data, duration of access rights to the data, time of access rights to the data, payment requirements for receiving access rights to the data, terms and conditions for the data, and combinations thereof. The first set of access rights may include payment requirements for receiving access rights to the source data that are billable to a unique party.

Each unique Read-Only PIN may be provided to each associated unique party. At block 721, the first unique Read-Only PIN is provided to the associated second party. Similarly, at block 723, the second unique Read-Only PIN is provided to the associated third party. At block 723, and similarly at block 753, each unique Read-Only PIN is stored with its associated unique set of access rights. Each unique Read-Only PIN may be stored with its associated unique set of access rights party in a records or file possessed by, or stored with, the data custodian, including, but not limited to, in a computer database at data storage units 154, 156.

At block 755, the data custodian may transmit a request for payment to the associated third party for use of the second unique Read-Only PIN. For example, the data custodian may send a bill or invoice to the associated third party by any appropriate method known in the art. The request for payment may be transmitted with the second unique Read-Only PIN. In an embodiment, the request for payment may be an alert that is transmitted to the associated third party when the associated third party attempts to connect with the Read-Only PIN website of the data custodian. In another embodiment, the request for payment, or a reminder of the request for payment, may be sent periodically to the associated third party by the data custodian until a payment is received or processed by the data custodian. At block 765, the data custodian may receive a payment from the associated third party. At block 767, the data custodian may process the received payment from the associated third party. If the payment is not successfully processed, the data custodian may, at block 769, inform the associated third party by any appropriate method in the art and loop the process back to block 755.

When the unique party associated with each of the unique Read-Only PINs desires access to the source data associated with each of the unique set of access rights, the unique party will transmit its associated unique Read-Only PIN to the data custodian. At block 727, or similarly at block 757, the associated second party Read-Only PIN or associated third party transmits the first unique Read-Only PIN or second unique Read-Only PIN respectively to the data custodian. At block 729, or similarly at block 759, the data custodian may receive the first Read-Only PIN or second Read-Only PIN from the associated second party or associated third party respectively. At block 731, or similarly at block 761, the data custodian may authenticate the received first unique Read-Only PIN or the received second unique Read-Only PIN respectively by any appropriate method known in the art. For example, the received first unique Read-Only PIN or the received second unique Read-Only PIN may be compared to the Read-Only PINs stored for the first party in records or files possessed by, or stored at, the data custodian, including, but not limited to, at data storage units 154, 156. As described above, if the received first unique Read-Only PIN, or similarly the received second unique Read-Only PIN, is not authenticated, the data custodian may inform the party transmitting the first unique Read-Only PIN, or similarly the second unique Read-Only PIN at block 733, or 763 respectively, that the unique Read-Only PIN provided at block 727, or 757 respectively, is incorrect by any appropriate method known in the art including, for example, by transmitting and/or displaying an error message on a computer terminal 108 of the transmitting party and looping the process back to block 757 or 727 as appropriate.

At block 735, if the first unique Read-Only PIN is authenticated, the data custodian may provide the second party with access to at least a portion of the source data of the first party using the associated first set of access rights. At block 771, and as described above, the data custodian may provide the associated third party with access to at least a portion of the source data of the first party, using the second unique set of access rights if the second unique Read-Only PIN is authenticated and if the payment from the associated third party is processed. In another embodiment, the data custodian may provide the associated third party with access to at least a portion of the source data of the first party, using the second unique set of access rights if the second unique Read-Only PIN is authenticated and if the payment from the associated third party is received. In an embodiment, at block 737, and as described above, the data custodian may determine usage requirements for the first unique Read-Only PIN. The data custodian, as described above, may provide the determined usage information to the first party at block 739. At block 741, the data custodian may cancel the first unique Read-Only PIN to prevent access by the associated second party to at least a portion of the source data of the first party associated with the first unique set of access rights of the cancelled first unique Read-Only PIN.

As shown by the various configurations and embodiments illustrated in FIGS. 1-7, a system and method for securing financial information have been described.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A system for providing access to data of a first party, comprising: a database that stores at least one virtual authentication credential, at least one access rights, and at least one party identifier; a computer processor associated with the database having a computer readable storage medium, the computer readable storage medium comprising computer-executable instructions stored therein causing the processor to: receive a first party identifier from a first party device; authenticate the first party using the first party identifier; generate, upon receipt of a request from the first party device, a virtual authentication credential using a random or pseudo-random generator; store, in the database, the virtual authentication credential; receive a selection from the first party device of a second party and a third party for receiving the virtual authentication credential; associate the virtual authentication credential with a second party identifier stored in the database and second party limited access rights for the data of the first party, wherein the second party limited access rights are based on second party data and stored in the database; associate the virtual authentication credential with a third party identifier stored in the database and third party limited access rights for the data of the first party, wherein the third party limited access rights are based on third party data and stored in the database; receive at least a portion of the second party identifier from a device associated with the second party; receive at least a portion of the third party identifier from a device associated with the third party; authenticate the second party and the third party using the at least a portion of the second party identifier, the at least a portion of the third party identifier, the second party identifier stored in the database, and the third party identifier stored in the database; receive the virtual authentication credential from the second party device; receive the virtual authentication credential from the third party device; authenticate the virtual authentication credential for the second party device and the third party device by comparing the virtual authentication credential received from the second party device and the third party device with the virtual authentication credential stored in the database; receive a payment from the second party device; process the payment from the second party device, and: when the payment is successfully processed: provide the second party device with limited access to the data of the first party as defined in the second party limited access rights; when the payment is not successfully processed: transmit an alert to the second party device that the payment could not be processed; provide the third party device with limited access to the data of the first party as defined in the third party limited access rights; determine usage information for the virtual authentication credential; and provide the first party with the usage information.

2. The system of claim 1, wherein the computer readable storage medium further comprises computer-executable instructions stored therein for causing said computer processor to:
cancel the virtual authentication credential to prevent any access by the second party device to the data of the first party.

3. The system of claim 2, wherein the computer readable storage medium further comprises computer-executable instructions stored therein for causing said computer processor to:
generate a new virtual authentication credential after the virtual authentication credential has been cancelled;
associate the new virtual authentication credential with the third party limited access rights for the data of the first party;
provide the new virtual authentication credential to the third party device;
store the new virtual authentication credential with the third party limited access rights in the database;

receive the new virtual authentication credential from the third party device;

authenticate the new virtual authentication credential by comparing the new virtual authentication credential with the new virtual authentication credential stored in the database; and provide the third party device with limited access to first party data as defined in the third party limited access rights.

4. The system of claim 1, wherein the second party limited access rights to data of the first party comprises at least one of: rights to read the data, rights to view the data, rights to modify the data, rights to manipulate the data, rights to download the data, rights to upload the data, rights to transfer the data, rights to share the data, rights to aggregate the data, rights to mine the data, rights to analyze the data, access rights to a subset of the data, duration of access rights to the data, time of access rights to the data, payment requirements for receiving access rights to the data, terms and conditions for the data, and combinations thereof.

5. The system of claim 1, wherein the second party limited access rights comprise rights to view data and rights to modify a subset of data.

6. The system of claim 3, wherein the third party limited access rights comprise rights to view data and rights to modify a subset of data.

7. The system of claim 5, the computer readable storage medium further comprising computer-executable instructions stored therein for causing said computer processor to:
store the data of the first party in a first computer file of the database; and
store the subset of the data of the first party in a second computer file of the database.

8. The system of claim 1, wherein the second party limited access rights comprise payment requirements for receiving additional access rights to data.

9. The system of claim 3, wherein the third party limited access rights comprise payment requirements for receiving additional access rights to data.

10. A non-transitory computer readable storage medium comprising instructions for causing a processor to execute a computer-implemented method for providing access to data of a first party, comprising: receiving a first party identifier from a first party device; authenticating the first party using the first party identifier; generating, upon receipt of a request from the first party device, a virtual authentication credential using a random or pseudo-random generator; storing, in a database, the virtual authentication credential; receiving a selection from the first party device of a second party for receiving the virtual authentication credential; associating the virtual authentication credential with a second party identifier stored in the database and second party limited access rights for the data of the first party, wherein the second party limited access rights are based on second party data and stored in the database; transmitting a request for payment to the second party for use of the virtual authentication credential; receiving at least a portion of the second party identifier from a device associated with the second party; authenticating the second party using the at least a portion of the second party identifier and the second party identifier stored in the database; receiving the virtual authentication credential from the second party device; authenticating the virtual authentication credential by comparing the virtual authentication credential received from the second party device with the virtual authentication credential stored in the database; receiving a payment from the second party device; processing the payment from the second party device, and when the payment is successfully processed: providing the second party device with limited access to the data of the first party as defined in the second party limited access rights; when the payment is not successfully processed: transmitting an alert to the second party device that the payment could not be processed; determine usage information for the virtual authentication credential; and provide the first party with the usage information.

11. The non-transitory computer readable storage medium of claim 10, wherein the non-transitory computer readable storage medium further comprises computer-executable instructions stored therein for causing said computer processor to:
cancel the virtual authentication credential to prevent any access by the second party device to the data of the first party.

12. The non-transitory computer readable storage medium of claim 11, wherein the non-transitory computer readable storage medium further comprises computer-executable instructions stored therein for causing said computer processor to:
generate a new virtual authentication credential after the virtual authentication credential has been cancelled;
associate the new virtual authentication credential with third party limited access rights for the data of the first party, wherein the third party limited access rights are based on third party data;
provide the new virtual authentication credential to a third party device;
store the new virtual authentication credential with the third party limited access rights in the database;
receive the new virtual authentication credential from the third party device;
authenticate the new virtual authentication credential by comparing the new virtual authentication credential from the third party device with the new virtual authentication credential stored in the database; and
provide the third party device with limited access to first party data as defined in the third party limited access rights.

13. The non-transitory computer readable storage medium of claim 10, wherein the second party limited access rights to data of the first party comprises at least one of: rights to read the data, rights to view the data, rights to modify the data, rights to manipulate the data, rights to download the data, rights to upload the data, rights to transfer the data, rights to share the data, rights to aggregate the data, rights to mine the data, rights to analyze the data, access rights to a subset of the data, duration of access rights to the data, time of access rights to the data, payment requirements for receiving access rights to the data, terms and conditions for the data, and combinations thereof.

14. The non-transitory computer readable storage medium of claim 10, wherein the second party limited access rights comprise rights to view data and rights to modify a subset of data.

15. The non-transitory computer readable storage medium of claim 12, wherein the third party limited access rights comprise rights to view data and rights to modify a subset of data.

16. The non-transitory computer readable storage medium of claim 14, the computer readable storage medium further comprising computer-executable instructions stored therein for causing said computer processor to:
store the data of the first party in a first computer file of the database; and store the subset of the data of the first party in a second computer file of the database.

17. The non-transitory computer readable storage medium of claim 10, wherein the second party limited access rights comprise payment requirements for receiving additional access rights to data.

18. The non-transitory computer readable storage medium of claim 12, wherein the third party limited access rights comprise payment requirements for receiving additional access rights to data.

* * * * *